US009150389B2

(12) United States Patent
Rintanen et al.

(10) Patent No.: US 9,150,389 B2
(45) Date of Patent: Oct. 6, 2015

(54) SYSTEM FOR THE IDENTIFICATION AND/OR LOCATION DETERMINATION OF A CONTAINER HANDLING MACHINE

(75) Inventors: Kari Rintanen, Espoo (FI); Mikko Sampo, Turenki (FI)

(73) Assignee: Konecranes Plc, Hyvinkää (FI)

( * ) Notice: Subject to any disclaimer, the term of this patent is extended or adjusted under 35 U.S.C. 154(b) by 126 days.

(21) Appl. No.: 13/263,190

(22) PCT Filed: Apr. 14, 2010

(86) PCT No.: PCT/FI2010/050301
§ 371 (c)(1), (2), (4) Date: Dec. 20, 2011

(87) PCT Pub. No.: WO2010/119180
PCT Pub. Date: Oct. 21, 2010

(65) Prior Publication Data

US 2012/0092643 A1 Apr. 19, 2012

(30) Foreign Application Priority Data

Apr. 15, 2009 (FI) ..................................... 20095411

(51) Int. Cl.
*G01S 17/88* (2006.01)
*B66C 13/46* (2006.01)

(52) U.S. Cl.
CPC ..................................... *B66C 13/46* (2013.01)

(58) Field of Classification Search
CPC ......... G01S 17/66; G01S 17/88; G01S 7/481; B66C 13/48; B66C 13/46; B61L 25/041; G06K 19/08; G06K 19/14; G06K 7/10861; G06K 1/126; G06K 2017/0045; B65G 63/004
USPC ......................................................... 356/4.01
See application file for complete search history.

(56) References Cited

U.S. PATENT DOCUMENTS 7,289,876 B2 * 10/2007 Lussen et al. ................. 700/213
7,387,393 B2 * 6/2008 Reich et al. .................. 359/529

(Continued)

FOREIGN PATENT DOCUMENTS

CN 201161875 12/2008
DE 3606363 A1 9/1987

(Continued)

OTHER PUBLICATIONS

International Search Report issued on Sep. 1, 2010 in International Application No. PCT/FI2010/050301 filed Apr. 14, 2010.

(Continued)

*Primary Examiner* — Luke Ratcliffe
*Assistant Examiner* — Vicente Rodriguez
(74) *Attorney, Agent, or Firm* — Drinker Biddle & Reath LLP

(57) ABSTRACT

The invention relates to a system capable of determining in which lane a container handling machine is present below a quay crane or the like crane and/or capable of determining the correct location of a container handling machine in its driving direction (y) with respect to a quay crane or the like crane as containers are delivered to the crane or containers are retrieved from the crane by the container handling machine. The crane is fitted with at least one scanning laser distance sensor or the like range finder, and the container handling machines are fitted with one or more reflectors whose height profile is used for the determination of a correct location and/or for the identification of a container handling machine and for the distinction thereof from other container handling machines.

16 Claims, 7 Drawing Sheets

(56) References Cited

U.S. PATENT DOCUMENTS

| | | | | |
|---|---|---|---|---|
| 7,922,085 | B2 * | 4/2011 | Thomas et al. | 235/384 |
| 2002/0024598 | A1 * | 2/2002 | Kunimitsu et al. | 348/159 |

FOREIGN PATENT DOCUMENTS

| | | | | |
|---|---|---|---|---|
| DE | 40 05 538 | | 8/1991 | |
| DE | 19630187 | A1 | 1/1998 | |
| GB | 2 425 520 | | 11/2006 | |
| GB | 2425520 | A * | 11/2006 | B66C 13/00 |
| JP | 2002-255476 | A | 9/2002 | |
| JP | 2003-252448 | | 9/2003 | |
| WO | 96/07929 | A1 | 3/1996 | |
| WO | 02/34663 | | 5/2002 | |
| WO | 2004/002871 | | 1/2004 | |
| WO | 2008/127955 | | 10/2008 | |

OTHER PUBLICATIONS

Finnish Search Report issued on Sep. 11, 2009 in related Finnish Application No. 20095411 filed Apr. 15, 2009.

European Search Report issued on Sep. 27, 2013 in European Application No. 10764150.8.

Australian Search Report dated Nov. 29, 2013 in corresponding Australian Patent Application No. 2010238448.

* cited by examiner

SYSTEM FOR THE IDENTIFICATION AND/OR LOCATION DETERMINATION OF A CONTAINER HANDLING MACHINE

RELATED APPLICATION DATA

This application is a §371 National Stage Application of PCT International Application No. PCT/FI2010/050301 filed Apr. 14, 2010, and claims priority under 35 U.S.C. §119 and/or §365 to Finnish Application No. 20095411 filed Apr. 15, 2009, both of which are incorporated by reference in their entirety.

The invention relates to a system as set forth in the preamble of the appended claim 1 for the identification of a container handling machine and/or for determining the location of a container handling machine. Both alternatives apply the same new and inventive features as subsequently revealed.

DESCRIPTION OF A PROBLEM TO BE ADDRESSED

The operation of a typical container port shall now be explained to the extent necessary for understanding the invention in terms of its operation. Most of the international transports of goods proceed nowadays by way of containers (1). Containers are standard shape transport units, inside which the goods are packed for the duration of a transport. Containers come typically in three different sizes, either 20 feet, 40 feet or 45 feet in length. Containers arrive in and respectively depart from a container port carried either by a container ship (2), container trucks or container trains. A standard shape transport unit makes the handling of cargo considerably faster at various stages of transportation, especially in the process of loading and unloading a container ship, as well as in a transshipment from marine transport to land transport (loading of a container truck) and vice versa. The presently described invention facilitates automation in the handling of containers, particularly in the process of loading and unloading a container ship, the focus of this description hence being on waterfront operations.

The container ship (2) is loaded and unloaded by using a special quay crane (4, FIG. 1), which transfers containers from the quay area onto a ship or respectively lifts containers from a ship onto the quay area. Various container handling machines (12), such as straddle carriers, prime mover/container trailer combinations, container reach stackers, or other suchlike vehicles capable of carrying one or more containers (1), deliver containers to be loaded to the waterfront area and, respectively, carry containers unloaded from a ship away from the waterfront area to a designated container storage field. Cooperation between the quay crane (4) and the container handling machines (12) will be discussed in more detail hereinafter (FIG. 1).

Alignment of the Container Handling Machine (12) and the Quay Crane (4)

First discussed is the unloading of containers from a ship. After mooring the container ship (2) to its berth at a quay (3), the quay crane (4) is driven to a position above the container ship for placing a boom (5) of the quay crane precisely on top of on-board constructed container silos (6) or container bays. The below-decks container silo (6) holds several containers stacked on top of each other, and the containers are stabilized in lateral direction by means of special guide bars. In addition, the topmost containers are stacked on the deck of a ship and interlocked by means of special clamps. The quay crane is moved in the direction of a quay by means of special tracks (7). However, moving a quay crane along the tracks is a slow process, which is why it is desirable to unload all side-by-side container silos (8) or container stacks (one full bay) successively from a ship for speedier operation. Thus, in accordance with FIG. 1, the container silos and stacks are grouped side by side for speedier loading and unloading. Along rails on top of the quay crane boom travels a special lifting trolley (9), to which is suspended a spreader (10) by means of lifting ropes. The quay crane operator steers the lifting trolley to a position precisely above a container to be picked up from aboard, lowers the spreader to the engagement with the container, thus coinciding special twist-locks present in the spreader with holes present in special corner castings at the corners of the container (1). This is followed by the twist-locks rotating through 90 degrees, whereby the spreader (10) takes hold of the container and the container can be lifted from the ship. When the container has been lifted out of the ship's container silo (6) to a height sufficient for its safe transfer onto the quay (3), the lifting trolley (9) and the container suspended from the trolley are driven to a position above the quay in alignment with a desired lane (11). Thereafter, the container can either be lowered to the ground or, alternatively, the container can be landed on a special container trailer or the like transport vehicle, which naturally must be driven to a position below the container prior to its descent.

The container can be lowered directly onto the ground on the quay (3) as long as the containers are to be shifted within a seaport area for example by means of special straddle carriers or the like container handling machines (12) capable of independently picking up containers from the ground and respectively also of lowering containers independently onto the ground. (The straddle carrier is also capable of stacking containers on top of each other, but this capability is not relevant to the invention.) When a seaport is operated for example by using straddle carriers, the quay crane (4) can use the quay (3) as a sort of buffer storage for containers, with several containers (1A, 1B) below the quay crane in various lanes (11) waiting either to be loaded onto a ship or, in the event of a ship being unloaded, for a transport of the containers (1A, 1B) to a container storage field.

In the process of loading a container ship, the operation proceeds in a reverse order. In this case, the quay crane's (4) operator picks up the container (1) to be loaded aboard either from the ground or from top of a container trailer. In the process of picking up from the ground for example a container left there by a straddle carrier, it is particularly important that the container (1A, 1B) has been left on the quay in a location (13) correct with respect to the quay direction in order to avoid unnecessary back and forth movement of the quay crane (4) along the tracks (7). It should be noted that a container ship is not always moored in a location exactly the same as before, whereby the correct spot (13) for leaving a container on a quay cannot be designated for example by painting symbols on the quay. Accordingly, one of the benefits of this invention relates explicitly to guiding the container handling machine (12), for example by means of traffic lights (21, FIG. 2), such that the container handling machine (12) arriving underneath the quay crane (4) comes to a halt below the quay crane at a correct spot in such a way that a container (1C, FIG. 1), being delivered for loading, has its center line (14) exactly at a right position below a center line (13) of the quay crane's (4) boom (5). When the straddle carrier or another suchlike container handling machine (12) is parked correctly, the container (1C) can be landed on the ground to wait for its loading onto a ship.

The system according to the invention can also be used in the event that containers are carried around within a seaport by means of container trailers and special prime movers towing the container trailers. Next follows a brief description of differences as this type of system is compared to an operation taking place for example by means of straddle carriers.

In the process of unloading the container ship (2), when the container (1) being unloaded from a ship is landed on top of a container trailer by the quay crane (4), or, alternatively, in the process of loading the container ship (2), when the container (1) being loaded aboard is picked up from top of a container trailer by the quay crane (4), it is natural that the container trailer must be located at the correct spot (13) in the quay direction in order to avoid unnecessary driving of the quay crane back and forth along the tracks (7) during ship unloading and loading operations. In case the container trailer is not placed exactly at a correct location in the quay direction, the operator of a prime mover towing the container trailer drives the prime mover/container trailer combination (12) slightly forward or backward, such that the quay crane (4) need not move along the tracks (7). However, the operation of a quay crane can be made faster by having the container trailer pre-parked at a correct spot. Indeed, one of the benefits of this invention relates explicitly to guiding a prime mover/container trailer combination or the like container handling machine (12), for example by means of the traffic lights (21) (FIG. 2), such that the container trailer is already waiting on the quay at the exactly correct location (13).

Identification of a Traffic Lane (11)

Another one of the benefits offered by the invention relates to the automation in keeping an inventory of containers. After a container (1) has been unloaded from a ship (2), the container is transported by a container handling machine (12) to an explicit container storage field, where the containers are stacked usually in rows and bays. The location of each container on the storage field is recorded in a special computer-based container terminal control system (TOS, Terminal Operating system), which contains an appropriate database. An objective today is that the tracking of container location be automated at every step of the handling process in order to avoid problems caused by human errors, specifically errors made by operators of the container handling machines (12). In the event that the operator of a container handling machine takes the container (1) on the container storage field to a location other than that presumed by the terminal operating system (TOS), or, alternatively, the operator of a container handling machine reports to the operating system (TOS) an incorrect container location, finding the container later on the container storage field will present a problem. Particularly in the event that a container has to be searched for on the storage field during a ship loading operation, the resulting costs will be especially high, because a particular objective at seaports is the minimization of ship unloading and loading times.

The container location on a container storage field can be monitored by means of prior known technology, by applying for example satellite positioning technology (GPS). In this case, the container handling machine (12) is fitted with a GPS receiver antenna and gear, which enables tracking the location of a container handling machine in real time, typically at the intervals of 1 second. In addition, by monitoring electrically twist-lock actions of the container handling machine (12), it is possible to verify that a container is grabbed and that the container is left on a stack of containers at a specific point in time. Being a natural presumption that the container (1) does not move unless moved by some container handling machine (12), the container location can be reliably tracked for as long as the container handling machine operates in an open area, within the visibility range of GPS positioning satellites.

However, GPS positioning technology does not work reliably underneath the quay cranes (4), which is why this technique is not a reliable way of detecting in which location, or particularly in which lane (11), a container is left by the container handling machine (12), or from which lane (11) a container is picked up by the container handling machine (12), or onto which lane (11) a specific container handling machine (12) (for example a prime mover/container trailer combination) proceeds to stand by for loading or unloading a container.

On the other hand, even the prior known technology enables reliable tracking of the container's (1) location as long as a container is being handled by the quay crane (4). For example, a pulse sensor (encoder) coupled with the lifting trolley (9) of a quay crane is able to reliably measure a location of the lifting trolley (9) on top of the boom (55) of a quay crane. Thus, the quay crane is capable of a reliable determination regarding on which lane (11) underneath the quay crane (4) the container (1A, 1B) being unloaded is landed or from which lane (11) the container (1A, 1B) being loaded on a ship is picked up. Still, for example in the process of unloading a ship, a problem arises from the situation in which the quay crane (4) has lowered more than one container down on the quay (FIG. 1, containers 1A and 1B). In this case, there is no way to conclude, without further information, as to which one of the containers is picked up by the container handling machine (12) arriving underneath the crane. As a consequence, there is no certain knowledge either regarding to which locations on the container storage field said containers (1A) and (1B) are transported and, thus, the automatic tracking of container locations is not possible. Respectively, in the process of loading a ship, there is no way of knowing, without further information, in which lane the container handling machine (12) leaves a container (FIG. 1, container 1C), as a result of which it is not possible to automatically identify in which location or silo (6) aboard the ship (2) the container (1C) is placed, or to automatically ensure that the container (1C) is actually loaded aboard.

In practice, as a ship is unloaded and loaded, the operation is overseen on the quay (3) by a person, one of whose responsibilities is to make sure that right containers are picked up by the container handling machine (12) and the quay crane (4). At this stage, however, there is a possibility of human errors, the elimination of which is pursued by automation. Also, a person on the quay (3) is not only an extra cost factor but also a source of hazardous situations as even fatal accidents take place at seaports as a result of this person being overrun by the container handling machine (12).

In the process of moving containers within the boundaries of a seaport by means of the prime mover/container trailer combination (12), similar situations arise as several prime mover/container trailer combinations arrive at the same time underneath the quay crane (4). Without further information there is no way of automatically tracking in which lanes (11) the vehicles become located, and, even though the quay crane (4), while unloading a ship, for example, does know on which lane (11) the unloaded container (1) is landed, there is no way of knowing on which prime mover/container trailer the container is loaded, nor can the subsequent container movements be automatically monitored even if the prime mover were equipped with a GPS gear as described above. Respectively, when there is a situation in the process of loading a ship that several prime mover/container trailer combinations (12) are standing by in adjacent lanes (11) for the pickup of containers lying on the trailers, the quay crane has no way of knowing without further information, even with the knowledge of from which lane (11) the container is picked up, which container is picked up.

In a summary of the foregoing, in order to enable an uninterrupted automation of the tracking sequence, it is particularly essential to identify from which lane (11) underneath the quay crane (4) a container is picked up by the container handling machine (12), on which lane (11) a container is left by the container handling machine (12), or in which lanes (11) the prime mover/container trailer combinations or other container handling machines (12) are located as containers are being picked up and loaded onto the container trailers by the quay crane (4).

The presently described invention is better than prior known technology in resolving the foregoing problems, especially in a situation where more than one container handling machine (12) arrive simultaneously underneath the quay crane (4). The presently described invention is also capable of resolving the foregoing problems without having to separately measure or determine a location of the quay crane (4). The prior art and its shortcomings will be discussed in the following.

DESCRIPTION OF THE PRIOR ART

As pointed out earlier, the container handling machines (12) can be located by means of satellite positioning (GPS). However, satellite positioning is a highly unreliable method underneath a quay crane or in some other satellite blind spot. In addition, this would also require a separate determination regarding a location of the quay crane (4) moving along tracks in order to enable determining a relative position of the container handling machine (12) and the quay crane (4).

The blind spot problem of GPS technology has been addressed e.g. by means of so-called dead reckoning and inertial navigation, for example with the use of gyroscope sensors. However, a problem in these techniques is a cumulative position error gathered by gyroscopes and odometers, which is why a reasonably priced system would only enable tracking the container handling machine (12) over short distances. However, the GPS satellite blind zone can be very large whenever several quay cranes (4) have been driven to side-by-side positions for unloading a single container ship (2).

Alternative container handling machine (12) positioning systems have been proposed, using for example a rotating laser beam mounted on the container handling machine and optical reflectors installed in the container field, for example on light poles, by the application of triangulation technique. A drawback in the system is nevertheless the difficulty in terms of installation and calibration (especially optical reflectors), a short range of the laser beam for example in fog, a necessity of cleaning the reflectors, false reflections from other shining objects, a high price of the equipment, as well as a necessity of positioning the quay crane separately. In addition, container handling machines set close to each other would block each other's operation and propagation of the laser beam.

Another alternative prior known container handling machine (12) positioning system is based on radio transmitters installed in a container storage field, for example on light poles, and on a radio receiver mounted on the container handling machine, which would involve measuring the radio signal propagation time and locating the container handling machine (12) by triangulation technique. A drawback in the system is nevertheless insufficient accuracy, difficulty in terms of installation and calibration (especially radio transmitters), a high price of the equipment, as well as a necessity of positioning the quay crane separately.

Still another prior known container handling machine (12) positioning method is based on ground-installed, so-called transponder sensors, as well as on a transponder reader (reading distance typically 10 . . . 20 cm) to be mounted on the container handling machine (12). A drawback in the system is nevertheless the difficulty of installation and calibration (especially ground-installed transponders), a considerably large number of necessary transponders, a high price of the equipment, maintenance required by the equipment (transponders), as well as a necessity of positioning the quay crane separately.

Yet another prior known technology for detecting and identifying the container handling machine (12) at close range is based on comparatively inexpensive RFID tags and RFID antennas. The positioning accuracy of RFID technique is nevertheless inadequate for working out the foregoing problems, especially when it would be necessary to read RFID tags from a long range (for example, such that the RFID tags would have been attached to the container handling machines (12) and the RFID antennas would have been attached to the quay cranes (4)). In the event that RFID tags were installed on the ground, such tags could naturally be read from a close range with an RFID antenna mounted on the container handling machine (12), but that would make the system similar to what was described above as a transponder-based system and would involve the same above-described major problems as those found in the transponder system.

Still one further prior known technology is based on the use of camera technique, wherein cameras mounted on the quay crane (4) are used for imaging, for example obliquely from above, container handling machines or passive optical reflectors or self-illuminating beacons mounted thereon. Drawbacks in camera technique nevertheless include reliability in various weather and lighting conditions, possible visual misinterpretations of other structures of the container handling machines (12) in image processing, as well as a necessity of cleaning the beacons as well as optics. In addition, the equipment carries a high price, particularly when using self-illuminating or otherwise active beacons mounted on container handling machines. It should be noted that there are typically a large number of the container handling machines (12) as compared to the number of the quay cranes (4). Therefore, it would be economically sensible to minimize the price of equipment mounted on the container handling machine (12). In addition, some container handling machines (for example the prime mover for a container trailer) are relatively reasonably priced, thus prohibiting the installation of expensive electronics on every machine.

In addition, there are various partial solutions proposed in the prior art for working out the foregoing problems. A certain type of apparatus, for example, would enable the identification of a correct lane (11) under a quay crane (4), but would not instruct the operator of a container handling machine (12) for stopping at a correct spot. Another apparatus may instruct the operator in terms of stopping, but is not capable of identifying the lane (11). This would make it necessary to provide a seaport with several overlapping sets of equipment functioning on various technologies, which of course would not be beneficial. Neither do many of the disclosed solution proposals enable the concurrent working of several container handling machines (12) underneath the quay crane (4), one of the reasons for this being, for example, that a laterally directed laser beam or radio beam, for example, is blocked by one container handling machine (12) from being detected by another container handling machine (12').

The presently proposed invention resolves the foregoing problems without the described prior art drawbacks

DESCRIPTION OF THE INVENTION

A solution of the invention for the identification of a container handling machine and/or for determining the correct location of a container handling machine is presented in the appended claim 1.

The invention will now be described in more detail with reference to the accompanying drawings, in which FIG. 1 shows unloading or loading of a container ship (2) by means of a quay crane (4);

Figure 1:
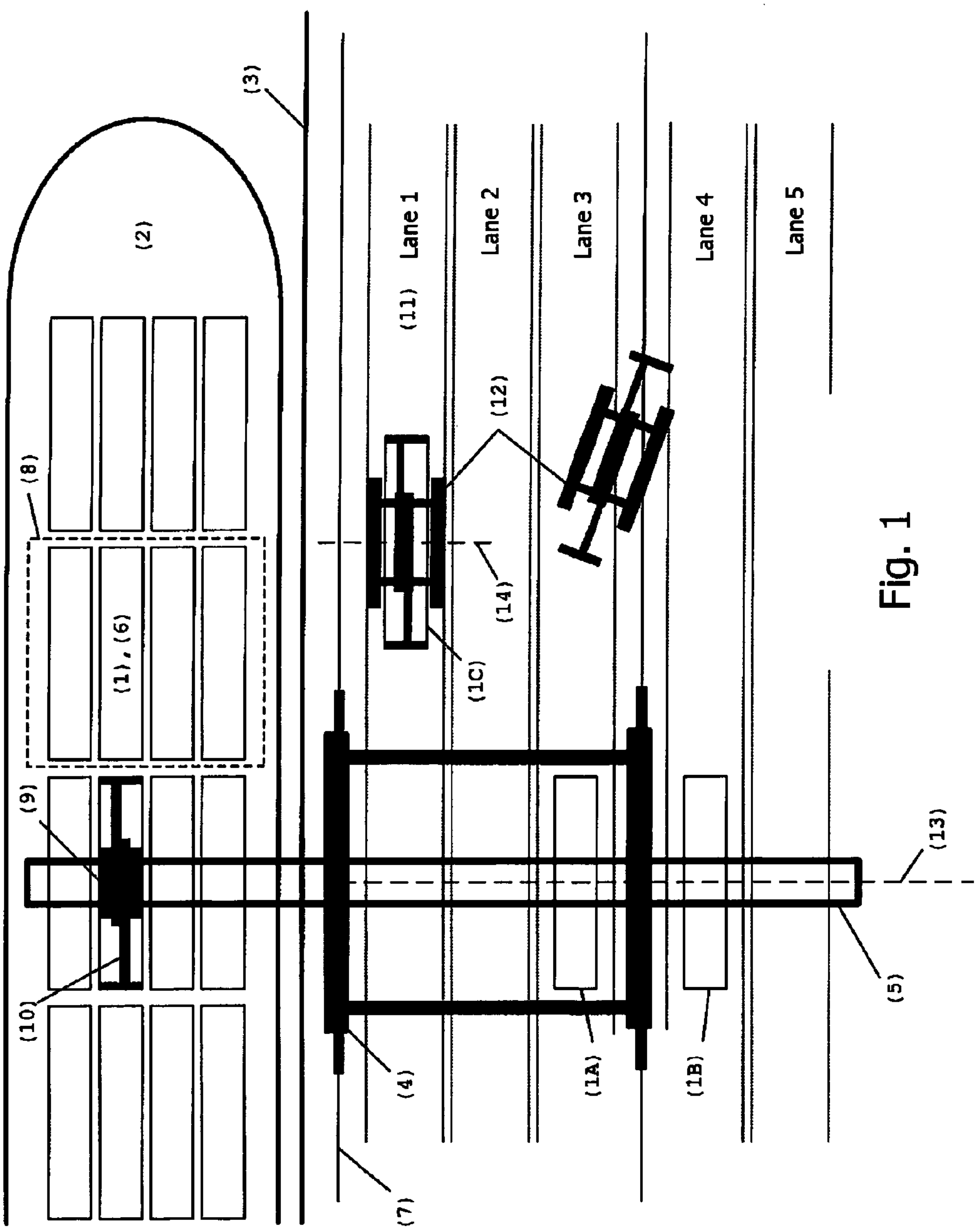

The system according to the invention is based on scanning laser distance sensors (17) (FIG. 2) mounted on quay cranes (4), and on passive reflectors (20) manufactured for example in sheet metal and mounted on container handling machines (12). The following discussion deals with the operation of a scanning laser distance sensor (17) to the extent necessary for understanding the operation of a system according to the invention.

In a first step, the laser distance sensor emits a short and narrow pulse (18) of laser light, typically in the order of about 1 meter in length and typically 20 centimeters in terms of its beamwidth (18, 19), measured at the distance of 20 meters. The emitted laser light can be visible or invisible (IR laser). In a second step, the emitted light pulse reflects from an object possibly found within the beam (18, 19) and some of the laser light returns to the laser distance sensor's light receiver. The laser distance sensor has a capability of detecting a reflection of the laser light pulse (18) for example from a distance as long as 30 meters, even if the reflecting object (for example a reflector (20)) were matt black in color and should only reflect back 10 percent of the light falling thereon. In case the object is lighter in color and reflects most (for example 90 percent) of the light falling thereon, objects can be detected from a lot further away, even from the distance of a hundred meters. In a third step, the laser distance sensor determines a time of flight between the emission and reception of a light pulse. This is typically implemented in such a way that the amount of received light is summed (integrated) in the light receiver, and as a sufficient amount of light (time×brightness) has been received, it is considered that a reflection of the light pulse (18) has arrived. Hence, the laser light beam (19) need not fall on an object in its entirety, but with light-colored objects, even a partial fall of the beam (19) on an object present closest in the light beam triggers the termination of a time-of-flight measurement. In a fourth step, the light propagation time of flight is used as a basis for calculating a range R between the reflective object and the laser sensor, and the reading is output for a user of the sensor. In addition to the range information R, another typically output item is an intensity I of the measured echo, which is proportional to the distance and color of a reflective object.

Figure 2:
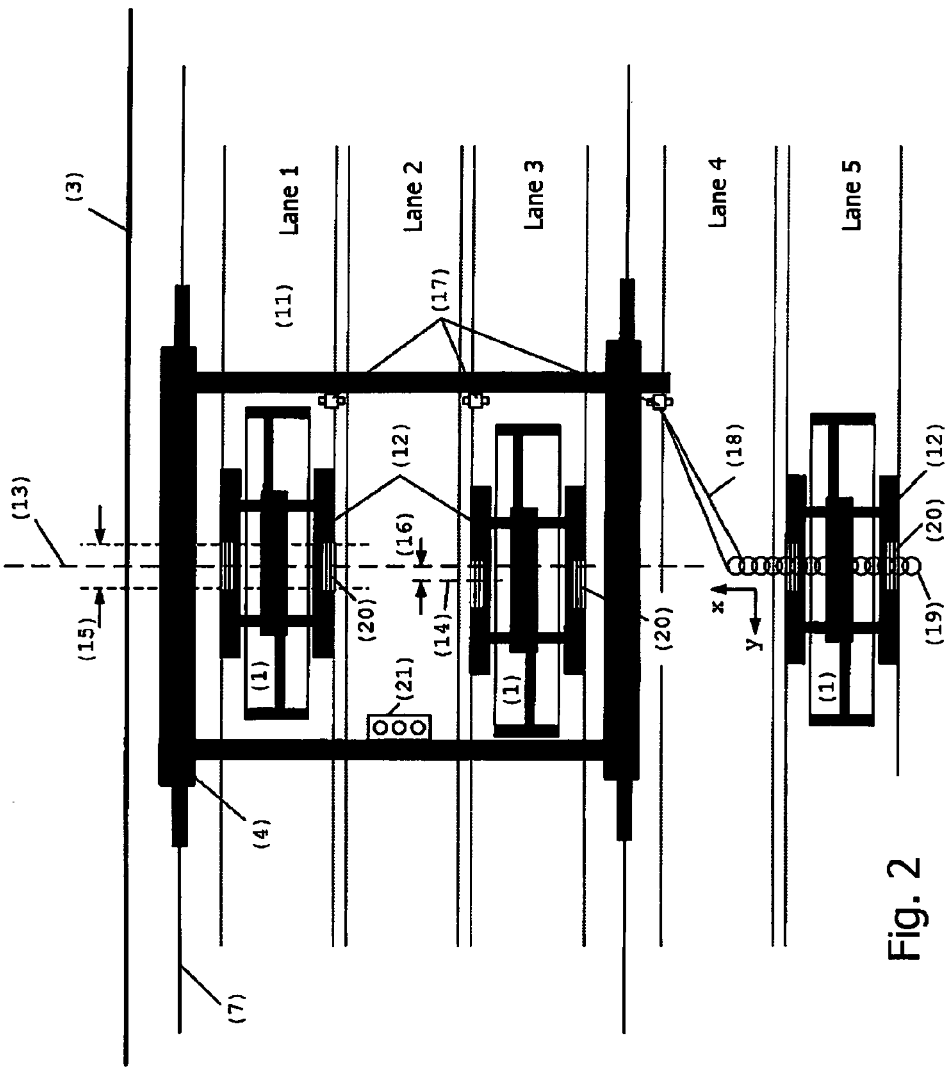
FIG. 2 shows lanes (11) underneath a quay crane (4) with container handling machines (12), for example a straddle carrier, bringing containers (1) therein.
Figure 3:
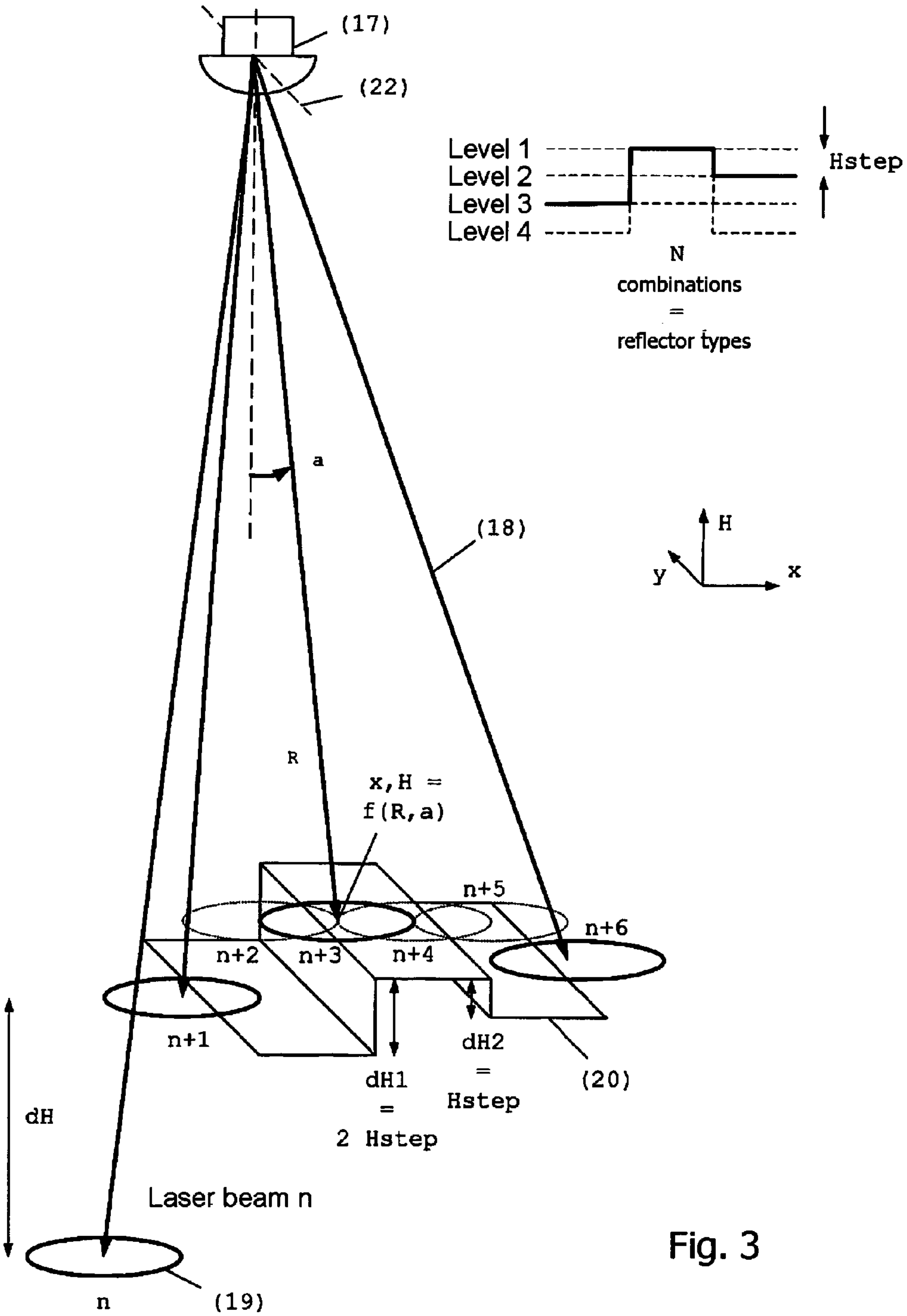
FIG. 3 shows one way of implementing a reflector (20) of the invention.

The operation of a scanning laser distance sensor (17), especially useful in the invention, is such that the above-mentioned laser distance sensor is attached to a rotor rotating at a high rate of speed (for example 50 revolutions per second) about its axis (22) (FIG. 3) and pulses (18) of laser light are emitted at a high rate in such a way that the completion of one preceding measurement for a range R is immediately followed by the emission of a next light pulse. When the rotating speed of a rotor and the emission rate of laser light pulses are properly adapted to each other, a laser light beam (19) n overlaps partially a preceding beam (19) n−1, and thereby the laser light beams (19) enable a continuous ribbon type range to be covered (FIGS. 2 and 3). The scanning laser distance sensor has its rotation axis (22) typically set in a position perpendicular to an axis (18) of the laser light beam, whereby the laser light beams (19) draw a straight line on the surface of an object (FIGS. 2 and 3). Naturally, the rotation axis (22) can be selected in some other way for implementing various curved scanning curves.

The scanning laser distance sensor (17) is inherently capable of measuring an emission angle (rotation angle) a for the laser beam (18) in real time by means of an internal set of sensors. Indeed, the sensor (17) typically outputs the following data for each individual laser range measurement: measuring angle (a), measured range (R), and reflection intensity (I).

The commercially available scanning laser distance sensors (17) are relatively reasonably priced and thereby quite suitable for automation according to the invention, yet do not inherently offer a solution to the foregoing technical problems. The most common application of scanning laser distance sensors involves safety features, such as the detection of an obstacle in the vicinity of a mobile work machine. For a sensor to cover, for example in order to detect an obstacle, a continuous area in its vicinity, the beam (18) must be quite large in terms of its width (19) (typically 20 centimeters at a range of 20 meters), and a step between two beams (19, 19') n and n+1 is also large (typically about 10 centimeters at a range of 20 meters). As a result of this, the scanning laser distance sensor (17) has inherently quite a poor lateral resolution, and the sensor as such is neither able to distinguish small details nor capable of providing accuracy in the order of centimeters in lateral direction. In addition, the container handling machines (12) are quite irregular in shape and thereby inherently ungrateful targets for precise positioning. Furthermore, the described type of sensor is not able, without special arrangements, to distinguish for example the container handling machines (12) from one another, particularly since the container handling machines (12) are basically identical to each other in terms of shape. Therefore, it has not been discovered earlier that the foregoing problems could be resolved with the described type of scanning laser distance sensor (17).

One Implementation Of The Invention

Figure 4:
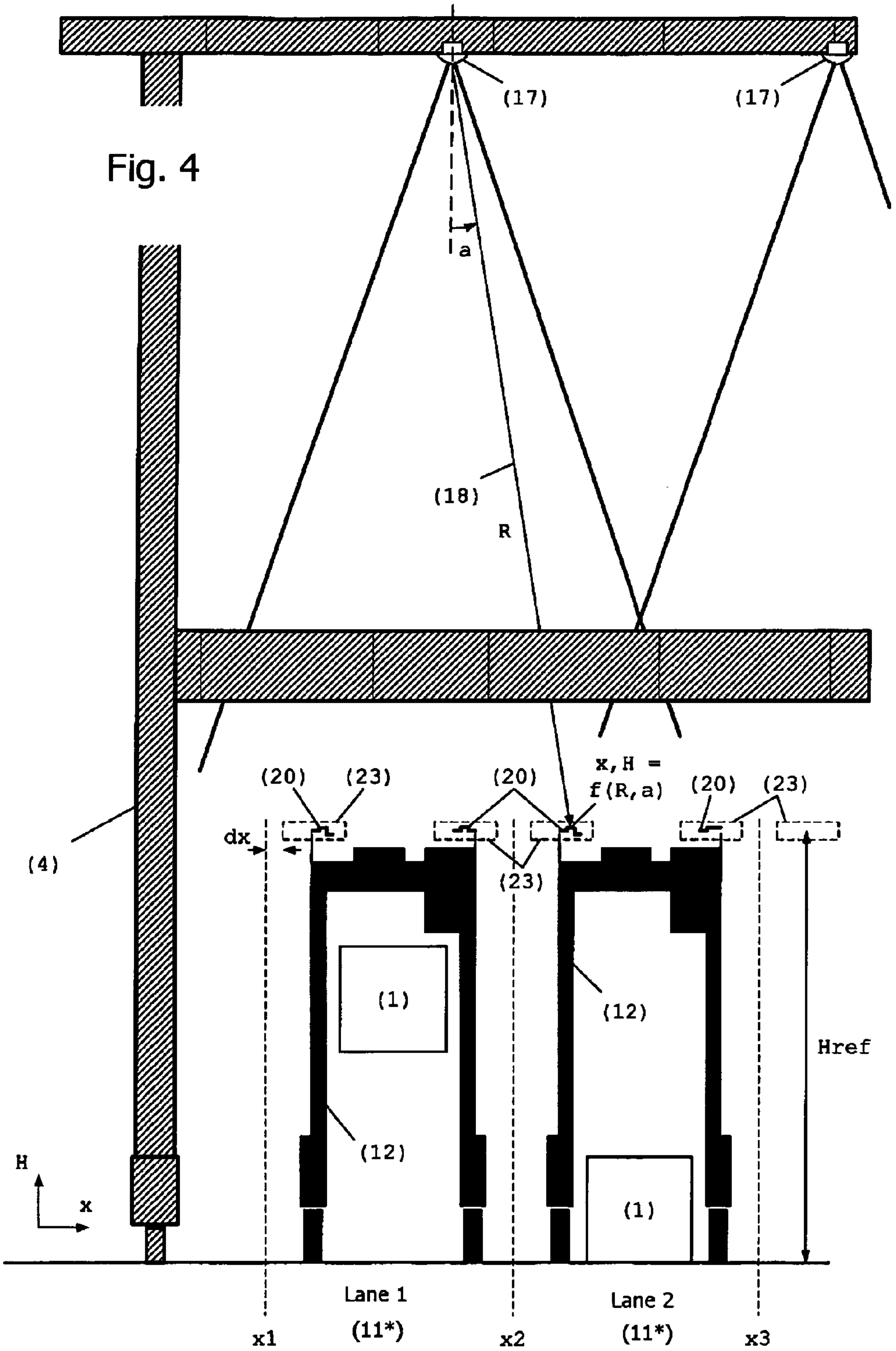
FIG. 4 is a lateral view of lanes (11) underneath a quay crane (4) with container handling machines (12), for example a straddle carrier, bringing containers (1) therein.

The following proposal relates to one implementation of the invention, which is particularly appropriate for an operation carried out by straddle carriers. In this case, one or more scanning laser distance sensors (17) are mounted, as shown in FIGS. 2 and 4, on a quay crane (4) above container handling machines (12), such that the laser beams have scanning lines (19), (19'), (19") . . . thereof in a perpendicular position (co-directional with coordinate axis x) relative to a quay (3), and falling on reflectors (20) included in the container handling machines (12) when the container handling machine is in a vicinity (15) of the quay crane's center line (13). In this case, the reflectors (20) would have been installed for example along the center line of a straddle carrier to the railings of its upper frame. A particularly beneficial feature in this arrangement is that, in the process of operating with straddle carriers, it is possible to pass through in either direction under the quay crane (4), because the arrangement is symmetrical. In the practical implementation, the laser distance sensors (17) cannot be installed directly above the center line (13), but, as shown in FIG. 2, it is necessary to install them in a slightly forward or rearward inclined position, such that the scanning line will be focused on the quay crane's (4) center line (13) explicitly at an installation height of the reflectors (20).

In case the port operation were based on the use of prime mover/container trailer type equipment, whereby, in practice, the reflectors (20) would have to be installed on prime movers, this would entail the use of separate laser distance sensors (17) for discrete driving directions. In addition, the scanning lines (19), (19'), (19") . . . would be focused according to the prime mover (not according to the center line of a carried container (1)).

Unless the reflectors (20) mounted on the container handling machine (12) were able to fit in their entirety in a lateral direction within the field of vision of one scanning laser distance sensor (17), the measurement readings of one or more sensors (17) could be integrated with each other, by aligning the separate sensors (17) with each other and by connecting the devices appropriately to a common data processing unit.

A length dimension for the reflectors (20) is selected in such a way that, when the container handling machine (12) is within an approach area (15) in the vicinity of what is the center line (13) in FIG. 2, the laser light beams (19) emitted by the laser distance sensors (17) fall on the reflectors (20) mounted to the container handling machines, and the range readings (R) reflected therefrom can be subjected to examination. One advantage of the system is that, as the quay crane (4) is moving along the tracks (7) to a new location, the scanning line of laser sensors also proceeds automatically to its new correct location.

In the process of studying measurement readings of the scanning laser distance sensors (17), a first step comprises converting, by the application of trigonometry, range-angle readings (R, a) representing a location of the measured reflections of a laser light beam (18) into position readings (x, H) representing a rectangular coordinate system, wherein H is a vertical coordinate and x is a horizontal coordinate representing the reflection in the direction perpendicular to a quay (3). Thus, (x, H) is perceived as the intersection of a laser light beam's center axis (18) and a reflecting surface (FIG. 3). As shown in FIG. 4, in case the container handling machine (12) is present in a given lane (11*) within the approach area (15), there are then received, from within an (x, H) window (23) (FIG. 4) relevant to the lane (11*), for example 6 . . . 7 successive reflections of the laser light beams (19), depending on the size of reflectors (20). In case the container handling machine is, as shown in FIG. 4, fitted with two reflectors (20), (20'), there are naturally received, from both respective (x, H) windows (23), an appropriate number of reflections. Conversely, in case no reflections are received from within an (x, H) window relevant to a lane (11), a conclusion can be made (FIG. 6) that the discussed lane does not have any container handling machine (12) present at all, but that the container handling machine has possibly proceeded onto some other lane (11). The size and location (Href, dx) of the (x, H) windows (23) are defined according to a size of the reflectors (20) and a known installation height and a known lateral position of the reflectors (20).

As appreciated by a skilled artisan, reflections can be received from a specific (x, H) window also when for example the railing of a straddle carrier, or some other frame member thereof at a sufficient height, passes through the window. In order to ensure a reliable identification, the system according to the invention indeed makes additional use of a prior known shape of the reflector (20). Moreover, in order to benefit from a type of system described above in the context of automating the container handling process, the situation, in which several container handling machines (12) are working at the same time underneath a quay crane (4), requires not only the detection that a certain lane (11) has a container handling machine present but also the recognition of the identity of this particular container handling machine, in other words, the capability of distinguishing container handling machines from one another.

One Configuration for a Reflector (20)

In the system according to one embodiment of the invention, the container handling machines (12) are distinguished from each other in such a way that the reflectors (20) mounted on container handling machines, or a combination of several reflectors (20), (20') mounted on a single container handling machine (12), are different from those of other container handling machines. One way according to the invention of designing mutually distinguishable reflectors (20) is to provide the reflector with a height profile $H_p$ (or more generally a range profile) which varies in a stepwise manner as shown in FIG. 3. As appreciated by a skilled artisan, the arrangement of FIG. 3 is but one example of how to realize the height profile $H_p$.

In a reflector as shown in FIG. 3, the reflector is hit by several (for example 6 . . . 7) successive laser light beams (19). The reflector has its height levels (Level 1 . . . Level 4) quantisized as shown in the figure with a specific minimum step Hstep, wherein, by comparing height values H calculated from successive laser reflections (19) with each other, it is possible to classify the reflections reliably for relative height levels Level 1 . . . Level 4. In this case, the quantization (Hstep) of height levels must be selected in such a way that the measurement noise of a laser range finding process R does not result in false interpretations of height levels. As the commercially available scanning laser distance sensors (17) have typically an R measurement noise level in the order of +/−5 millimeters, the selected step (Hstep) between height levels can be for example 5 centimeters. One benefit of the invention is that a possible variation in the absolute elevation of a reflector (20), for example due to varying terrain or air pressures in tires, does not affect the reliability of interpretation, because just relative height differences dH1 and dH2 are subject to examination (FIG. 3). In such a procedure it is possible, for example according to FIG. 5, to determine the highest level (Level 1) according to the maximum measured height value (Hmax), and to place thereafter the separating boundary surfaces of the levels at Hstep intervals, the separating boundary surface of Levels 1 and 2 being at a half-step Hstep/2 lower level than the maximum measured height value Hmax.

When using a reflector (20) as shown in FIG. 3, from one height level can be received either one or more reflections of adjacent laser light beams (19), depending on a precise position of the reflector (20) in x-direction, and on the widths of the reflector's (20) height levels. Particularly from the highest level are typically received a plurality of reflections due to the above-described principles of a laser range finding process (several partial reflections). In the exemplary case of FIGS. 3 and 5, the reflections (a point set P) received from the reflector (20), when interpreted as relative height levels, are:

(Level) 3-1-1-1-1-2 (6 reflection in total).

If the reflector (20) were now moved slowly towards a positive direction of the x axis, the reflections would change, when interpreted as relative height levels, in accordance with the following iterative Pattern (1):

3-1-1-1-2-2 (6 reflections in total)
3-3-1-1-1-2-2 (7 reflections in total)
3-3-1-1-1-2 (6 reflections in total)
3-1-1-1-1-2 (6 reflections in total).
Pattern (1)

As appreciated by a skilled artisan, the measurements-processing computer program of a scanning laser distance sensor (17) is readily capable of processing these various options, for example such that patterns (as above) for acceptable reflections, representing each different reflector (20) are tabulated in the computer memory.

Figure 5:
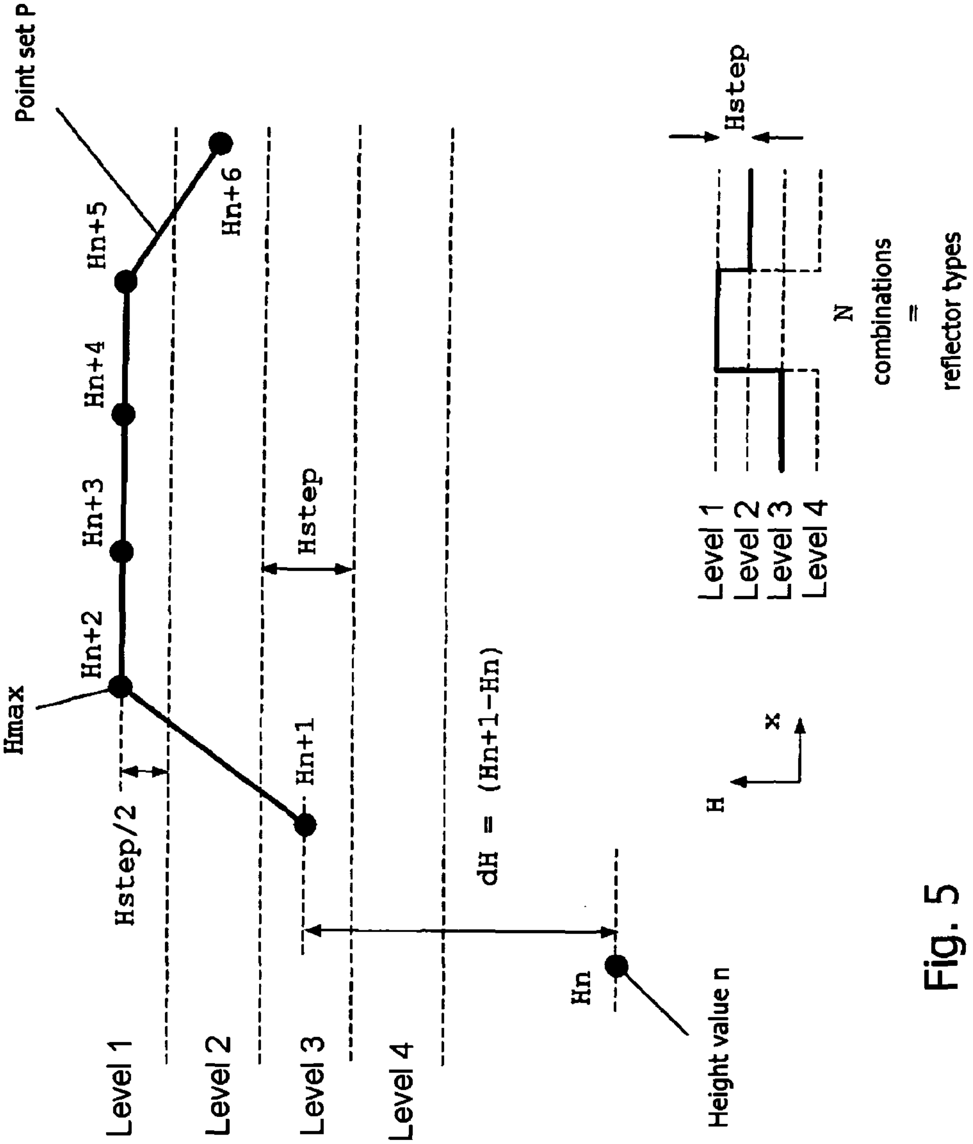
FIG. 5 shows one possible method of implementing the invention.

FIGS. 3 and 5 also illustrate one possible method, by which an edge of the reflector (20) can be reliably distinguished from other elements of the container handling machine (12), for example from railings. The method can be utilized in the process of working out the point set P of FIG. 5, which is compared for example to the values of Pattern (1). It is appropriate to install the reflector (20) in such a way that the reflector has its edge at a higher level than a given predetermined value (for example 3 HStep) with respect to other structural elements of a container handling machine immediately adjacent to the reflector (20). If a difference dH=Hn+1−Hn (FIGS. 3 and 5) in height values between the reflections of two successive laser beams (19) is more than this predetermined value (for example 3 Hstep), the excessively deviating value will no longer be qualified for the point set P (FIG. 5). In this case, naturally, the height variation between side-by-side levels of the reflector (20) may not exceed the value 2 Hstep. It should be noted that the described method allows individual structural elements of a container handling machine to rise higher than the reflectors (20) as long as these higher elements do not lie immediately alongside the reflector.

The type of configuration shown in FIG. 3 for the reflector (20) enables using different values dH1 and dH2 of the two lower height levels for providing an N number of various combinations and thereby an N number of identifiable reflectors (20) different from each other. The number N depends naturally on the number of available height levels and the size of a step (Hstep) between the height levels. It is further obvious for a skilled artisan that certain combinations of height levels, for example those in which the middle level lies at a lower level than the outermost levels, cannot be used on account of visibility if the level has a width narrower than that of the laser beam (19). However, it is by no means mandatory to employ all combinations, or particularly undesirable combinations of the described type, in a system of the invention. If two adjacent levels of the three height levels depicted in FIG. 3 are at an equal level, this condition can be detected (and the relevant reflector identified), based on the fact that the number of reflections received from the successive laser light beams (19) is so large that such large number of beams would not fit within the area of a single height level, but consequently there must be two adjacent levels of equal height.

In the event that a single container handling machine (12) is fitted with more than one reflector (20), for example two reflectors, various combinations of these two reflectors (20), (20') can be used for unambiguously identifying an N×N strong fleet of the container handling machines (12).

Figure 6:
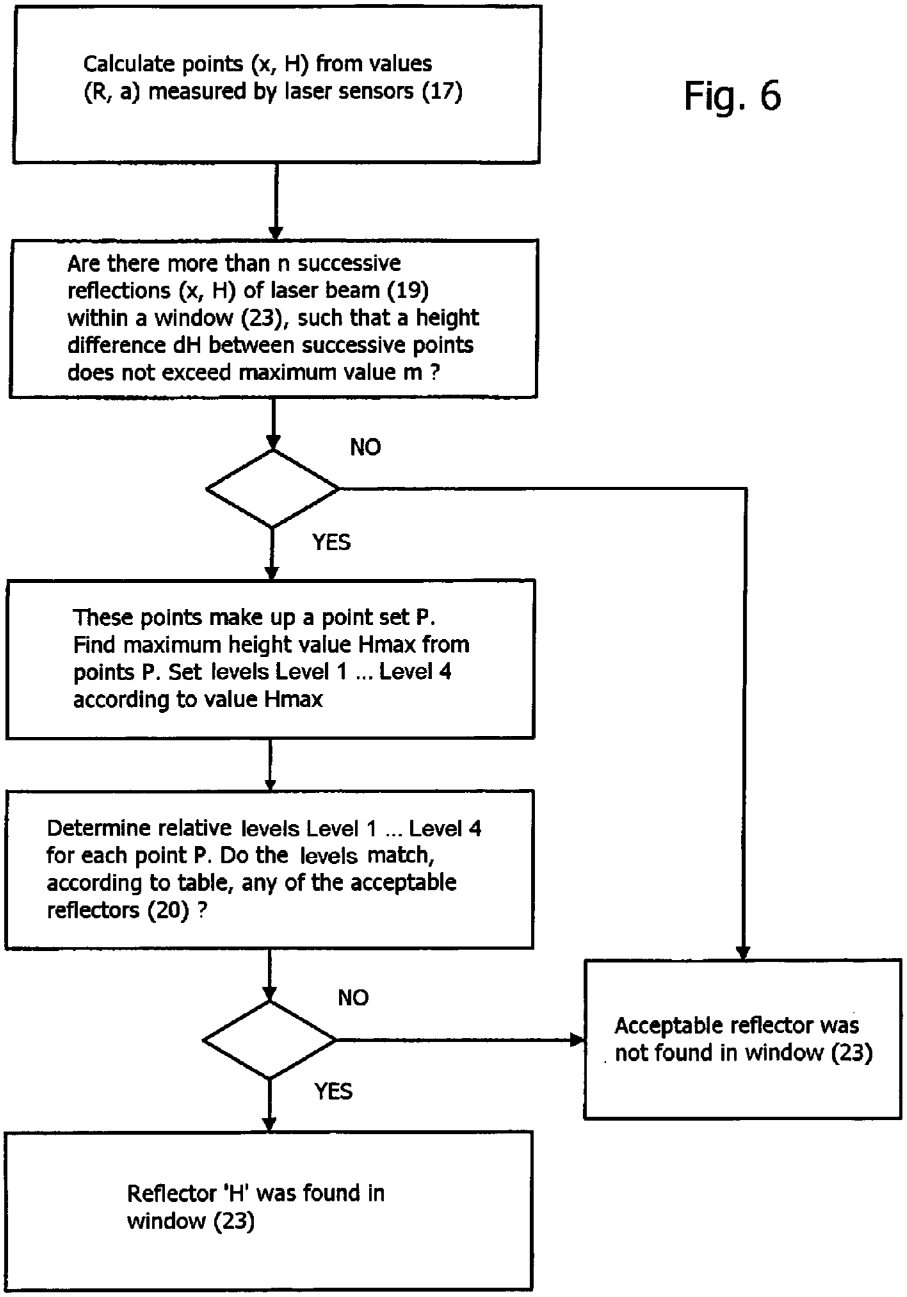
FIG. 6 shows one possible algorithm for implementing the invention.

Although the above-described configuration for the reflector (20) mainly enables a construction of various types of reflectors (20) and thereby a distinction of the container handling machines (12) from each other, the above-described configuration brings also necessary extra security for a reliable identification of the reflector (20) and a distinction thereof from other structures of the container handling machine (12). FIG. 6 shows, in the form of a summary, one possible algorithm for identifying the reflector (20) by way of a specific (x, H) window (23).

When various reflector options (20), and possible height patterns (as Pattern (1)) produced thereby, are known beforehand, the measurements can be stripped of results which do not match any of the previously known options, but which are false reflections for example from the railings of a straddle carrier or from the ceiling of an operator's cabin. Particularly in a situation, in which the container handling machine (12) is fitted with two reflectors (20) which should be visible simultaneously in (a, H) windows (23) of FIG. 4, there is achieved excellent reliability, because the cabin ceiling of a straddle carrier, or another similar source of false reflections, possibly only visible in one of the windows, would not in this case result in possible misinterpretations. However, a skilled artisan can understand that, even if just a single reflector (20) were used, the elimination of wrong interpretations from reflections caused by other structures of the container handling machine is possible by choosing shapes and locations of the reflectors (20) in the container handling machine (12) in such a way that the matching shape cannot appear in the (a, H) window (23) except by the action of the reflector (20). For example, the cabin of a straddle carrier has a ceiling or roof which is usually consistently horizontal and, in practice, at a clearly lower level than the reflectors (20). Respectively, the railings of a straddle carrier are very narrow indeed and, thus, the number of side-by-side reflections emitted thereby is not sufficient for interpreting those railings as a reflector (20).

Control for the Precise Stopping of a Container Handling Machine (12)

Figure 7:
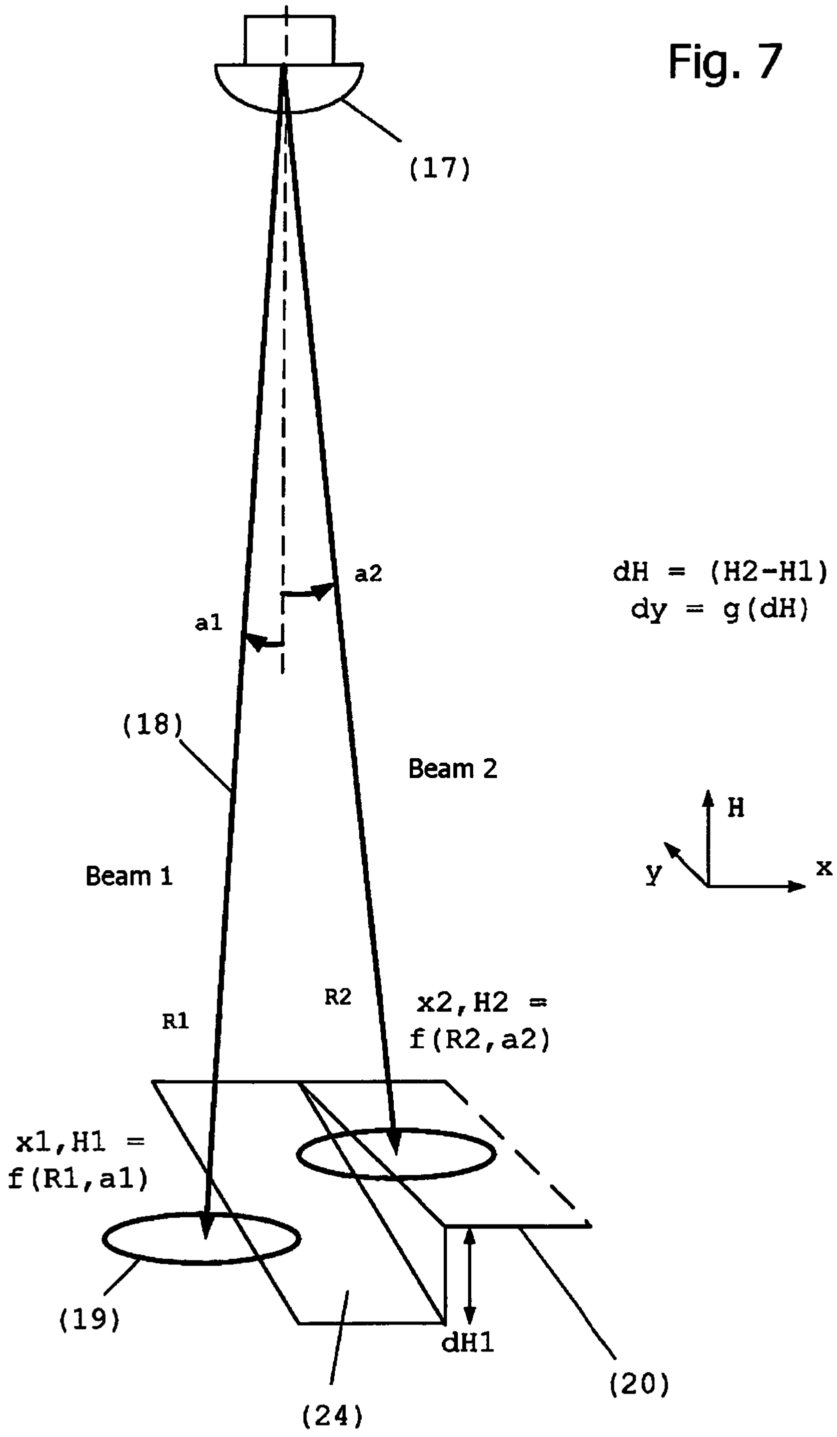
FIG. 7 shows one way of implementing a reflector (20) of the invention.

The above discussion has been about an identification process according to the invention for the container handling machine (12) underneath the crane (4) and about a location determination of the container handling machine in the alternative lanes (11). Another major benefit provided by the invention is achieved in such a way that one or several of the reflectors (20) are provided with a special portion (24), which is rising or falling in a traveling direction y of the container handling machine (12) or otherwise varying in its height, and on the basis of which a location of the container handling machine can be more accurately defined in the vehicle traveling direction y. One such solution is depicted in FIG. 7, in which the measured height difference between adjacent levels of the reflector (20) changes linearly as the container handling machine (12) proceeds forward or backward (in the direction y). By measuring this height difference dH, it is thereby possible to determine precisely a deviation (16) of the container handling machine (12) (FIG. 2) in the driving direction y from a desired loading line (13) of the quay crane (4). At its simplest, this deviation dy (16) can be calculated for example by a formula:

$$dy = K1\,dH - K2, \qquad (1)$$

wherein K1 and K2 are constants. Since the accuracy of a relative height measurement dH is typically in the order of +/−5 millimeters, the deviation dy (16) can be determined at a high accuracy, even at the accuracy of centimeters, depending on the inclination (K1) of the level (24). As soon as the deviation dy (16) in the driving direction has been determined, an operator of the container handling machine (12) can be instructed, according to one implementation of the invention, to drive either forward or backward to a correct location for the container (1) to be loaded, unloaded or for the container (1) to be left there or for picking up the container. This instruction of the operator can be carried out for example with traffic lights (21) (FIG. 2) attached to the frame of the quay crane (4). A special benefit provided by the solution of the invention is that, as the quay crane (4) is moving along the tracks (7), a stopping location desirable for the container handling machines (12) is moving automatically along with the quay crane (4). Another benefit offered by the solution of the invention is that the measurement of a precise stopping spot is performed by the same scanning laser range finder (17) as the identity recognition of a crane lane (11) and a container handling machine (12), thus achieving quite a high versatility in a cost-effective manner and with very inexpensive reflector solutions in mobile vehicles (12), the number of which may be quite substantial.

In case of making use of this aspect of the invention, the algorithm of FIG. 6 will be subjected for example to the next described variation. In the process of tabulating acceptable relative levels (Level 1 . . . Level 4) of the reflector (20) for a reflector of FIG. 7, an arbitrary value will be accepted for the reflector's (20) inclined portion (24) for example as follows:

x-1-1-1-1-2 (6 reflections in total), wherein x can be any level for example between 1 . . . 3. Then, as the relevant reflector (20), including the inclined level (24), has been accepted by using for example the algorithm of FIG. 6, the following step is such that an examination will be conducted in a previously described manner regarding the exact height difference dH of the outermost reflection as compared, for example, either to an adjacent level or to the highest level (Hmax).

Clarifications Of Figures

FIG. 1. Shows the loading or unloading of a container ship (2) by means of a quay crane (4). Containers (1) are lifted from the container ship's (2) container silos (6) by means of a container spreader (10) hanging on ropes from a lifting trolley (9) of the quay crane. This is followed by driving the lifting trolley (9) along a boom (5) to place it above a quay (3) in alignment with a desired lane (11). Thereafter, the container (1) can be lowered down on the ground or on top of a container trailer. The unloaded or to-be-loaded containers (1) are carried by container handling machines (12) to a container storage field and onto the quay (3).

FIG. 2. Shows lanes (11) present below a quay crane (4), having containers (1) delivered therein by container handling machines (12), for example by a straddle carrier. The straddle carrier should have its mid-line (14) in coincidence with a mid-line (13) of the quay crane (4) as the container is lowered on the ground to eliminate the need of moving the quay crane (4) along tracks (7) for picking up the container (1). The quay crane (4) has its frame provided with scanning laser distance sensors (17), with laser light beams (18, 19) emitted thereby reflecting from reflectors (20) attached to the container handling machines (12) and enabling, among other things, a measurement for a deviation (16) and a determination of the lane (11).

FIG. 3. Shows one way of implementing a reflector (20) of the invention. The reflector (20) has its height levels (Level 1 . . . Level 4) quantisized as multiplications of a step Hstep. Successive laser light beams (18, 19) n+1 . . . n+6, emitted by a laser distance sensor (17), reflect from various height levels of the reflector (20). Range-angle readings (R, a), measured by the laser distance sensor (17), are converted trigonometrically into location-height (x, H) readings for a rectangular coordinate system.

FIG. 4. Shows an elevation of lanes (11) present below a quay crane (4), having containers (1) delivered therein by container handling machines (12), for example by a straddle carrier. The quay crane (4) has its frame provided with scanning laser distance sensors (17), with laser light beams (18) emitted thereby reflecting from reflectors (20) attached to the container handling machines (12) and enabling, among other things, a determination of the lane (11). Range-angle readings (R, a), measured by the laser distance sensor (17), are converted trigonometrically into location-height (x, H) readings for a rectangular coordinate system. This is followed by studying whether windows (23) are hit by reflections that could be interpreted as reflectors (20).

FIG. 5. Shows one possible implementation method for the invention, whereby accepted height values (Hn+1 . . . Hn+6=point set P), measured from a reflector (20), are classified for relative levels Level 1 . . . Level 4. Point Hn is not qualified for the point set P, because of an excessive height difference dH. Level 1 is set according to a highest measured height value Hmax, such that the decision boundary surface of Levels 1 and 2 lies at a level, which is by a value Hstep/2 lower than the highest measured height value Hmax.

FIG. 6. Shows one possible algorithm for implementing the invention, which is used for studying whether the (x, H) window (23) of FIG. 4 is hit by readings (R, a), which are measured by scanning laser distance sensors (17) and which could be interpreted as accepted reflectors (20).

FIG. 7. Shows one way of implementing a reflector (20) of the invention, by which a deviation (16) in the location of a container handling machine (12) can be measured at a mid-line (13) of a quay crane (4). The reflector (20) of FIG. 7 comprises an inclined portion (24), by virtue of which a height difference dH between laser light beams 1 and 2 changes linearly as the container handling machine (12) moves in its traveling direction y.

The invention claimed is:

1. A system capable of determining in which lane a container handling machine is present below a quay crane, gantry crane, or container crane as containers are delivered to the crane or containers are retrieved from the crane by the container handling machine, wherein the crane is fitted with at least one distance and angular position sensor, and the container handling machines are fitted with one or more reflectors whose height variations are measured using said distance and angular position sensor for the determination of a correct location and for the identification of the container handling machine and for the distinction thereof from other container handling machines.

2. A system as set forth in claim 1, wherein the system is capable of serving several container handling machines simultaneously.

3. A system as set forth in claim 1, wherein the container handling machine has more than one reflector, the combination of which is used for recognizing the identity of the container handling machine.

4. A system as set forth in claim 1, wherein at least one reflector is provided with a portion, inclined in terms of its height in a driving direction (y) of the container handling machine, for determining the correct location of the container handling machine.

5. A system as set forth in claim 1, wherein at least one reflector is provided with a plurality of constant height levels, changing in a stepwise manner in a direction (x) perpendicular to a driving direction of the container handling machine.

6. A system as set forth in claim 5, wherein height values measured by the distance and angular position sensor are matched to a plurality of predetermined constant height levels.

7. A system as set forth in claim 6, wherein measurements matched to the plurality of constant height levels are compared to predetermined options of height levels, programmed onto a computer and matching various reflectors.

8. A system as set forth in claim 1 capable of determining the correct location of the container handling machine in its driving direction (y) with respect to the quay crane, gantry crane, or container crane as containers are delivered to the crane or containers are retrieved from the crane by the container handling machine, wherein the height variations of the one or more reflectors are used for the determination of the correct location of the container handling machine.

9. A system capable of determining a correct location of a container handling machine in its driving direction (y) with respect to a quay crane, gantry crane, or container crane as containers are delivered to the crane or containers are retrieved from the crane by the container handling machine, wherein the crane is fitted with at least one distance and angular position sensor, and the container handling machines are fitted with one or more reflectors whose height variations are measured using said distance and angular position sensor for the determination of the correct location of the container handling machine.

10. A system as set forth in claim 9, wherein the system is capable of serving several container handling machines simultaneously.

11. A system as set forth in claim 9, wherein the container handling machine has more than one reflector, the combination of which is used for recognizing the identity of the container handling machine.

12. A system as set forth in claim 9, wherein at least one reflector is provided with a portion, inclined in terms of its height in the driving direction (y), for determining the correct location of the container handling machine.

13. A system as set forth in claim 9, wherein at least one reflector is provided with a plurality of constant height levels, changing in a stepwise manner in a direction (x) perpendicular to the driving direction.

14. A system as set forth in claim 13, wherein height values measured by the distance and angular position sensor are matched to a plurality of predetermined constant height levels.

15. A system as set forth in claim 14, wherein measurements matched to the plurality of constant height levels are compared to predetermined options of height levels, programmed onto a computer and matching various reflectors.

16. A system as set forth in claim 9 capable of determining in which lane the container handling machine is present below the quay crane, gantry crane, or container crane as containers are delivered to the crane or containers are retrieved from the crane by the container handling machine, wherein the height variations of the one or more reflectors are used for the determination of the correct location and for the identification of the container handling machine and for the distinction thereof from other container handling machines.

* * * * *